Patented Oct. 14, 1924.

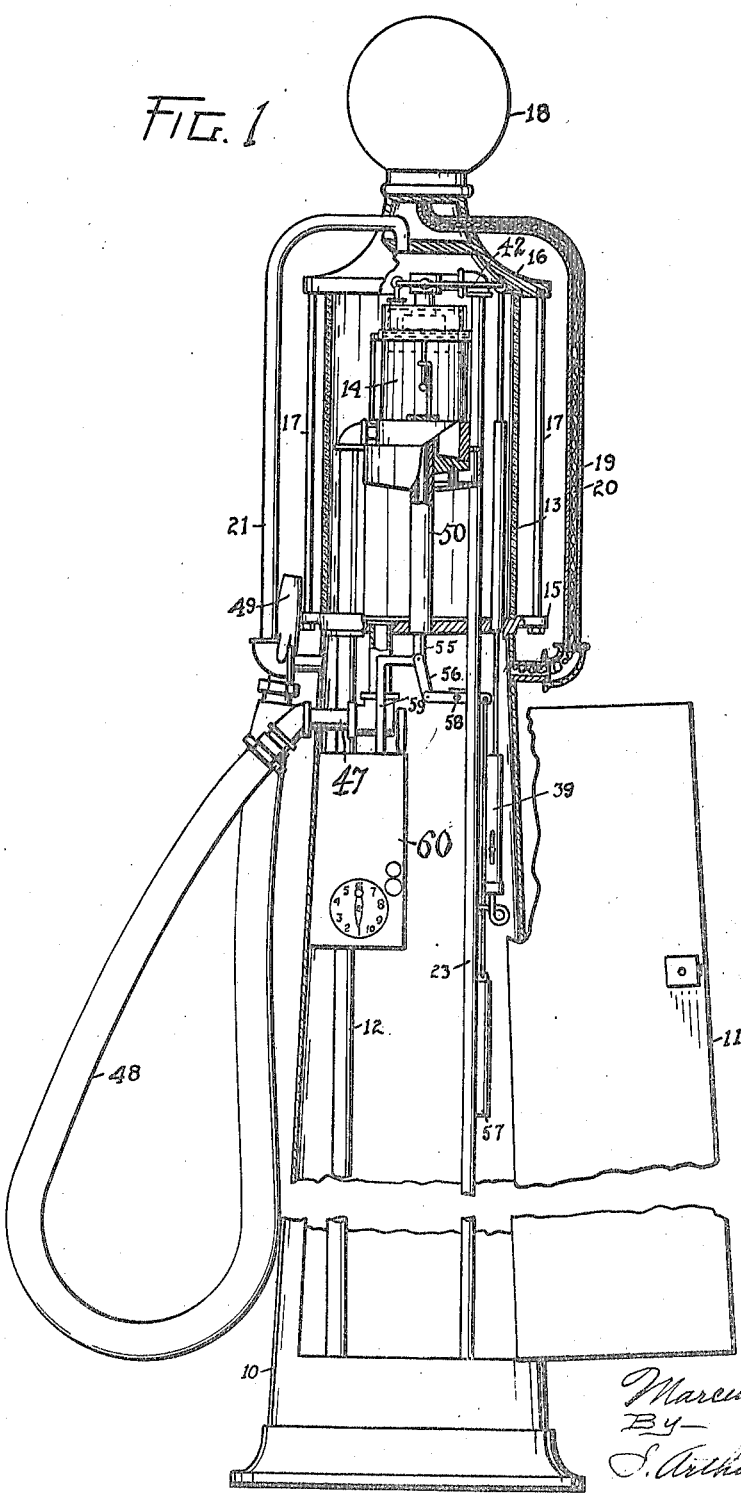

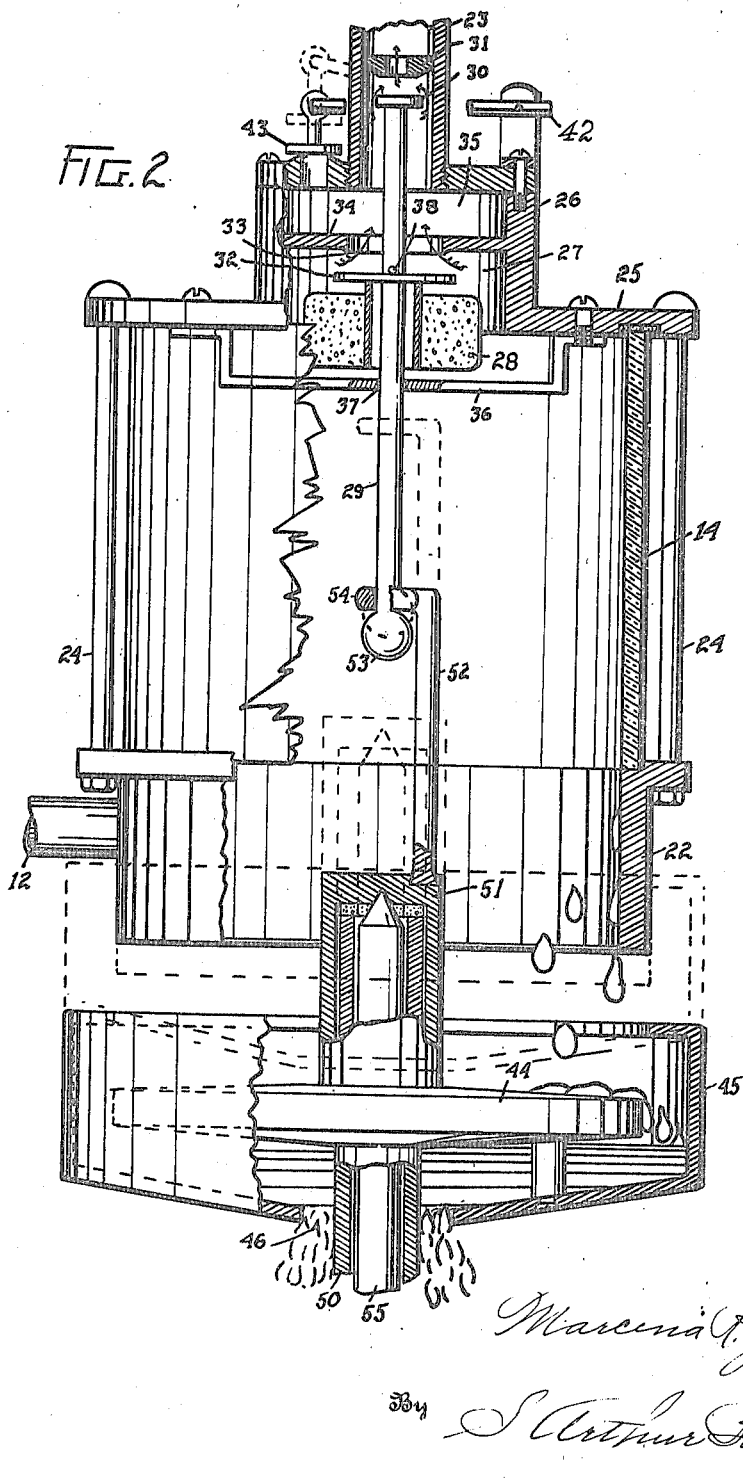

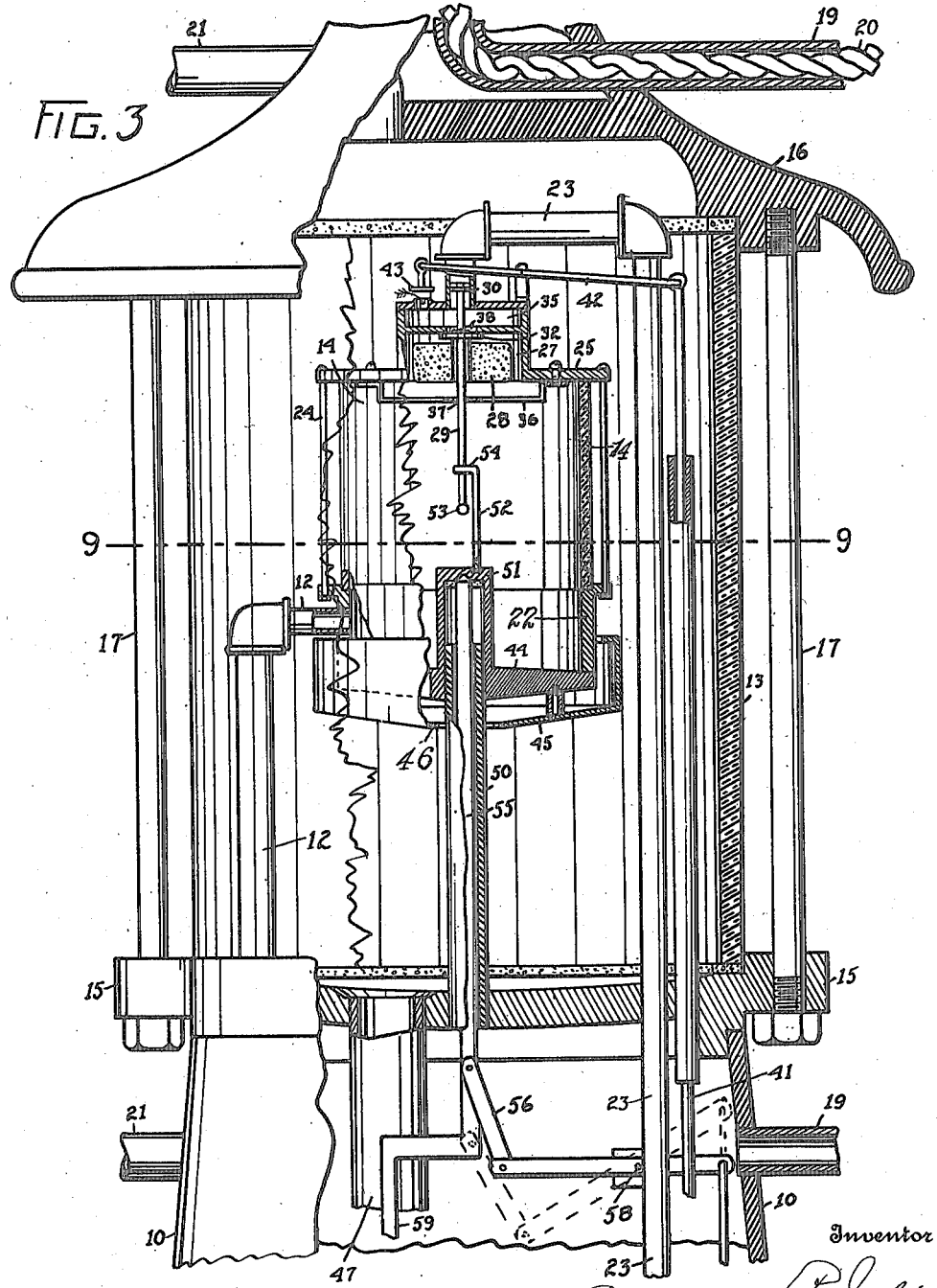

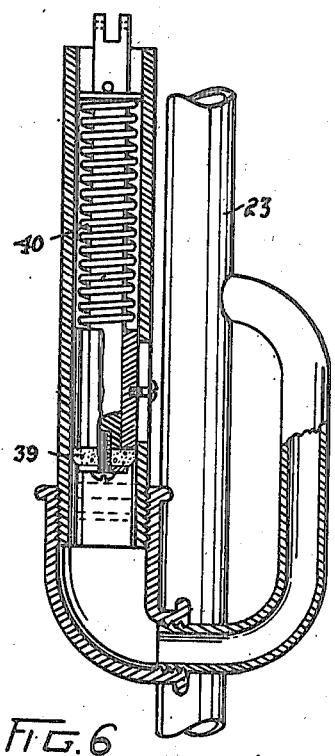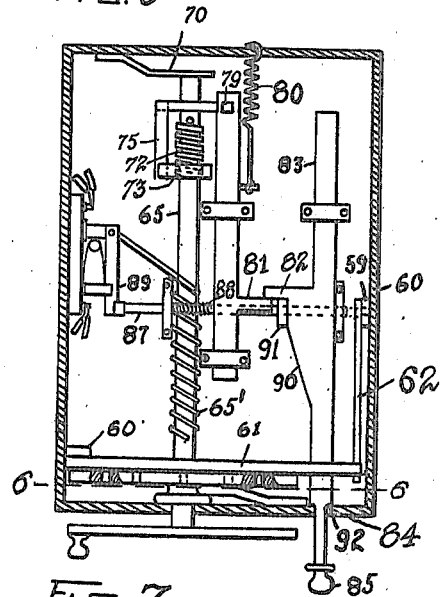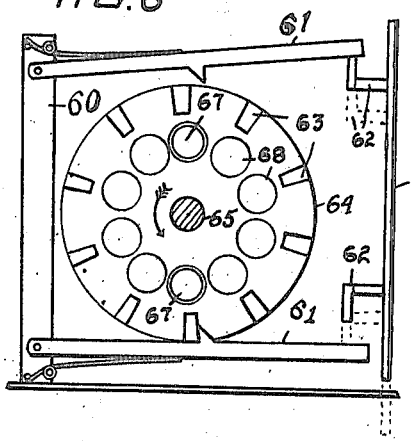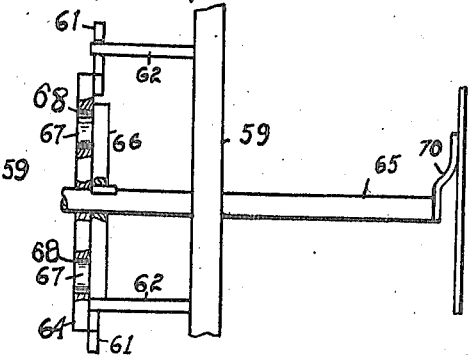

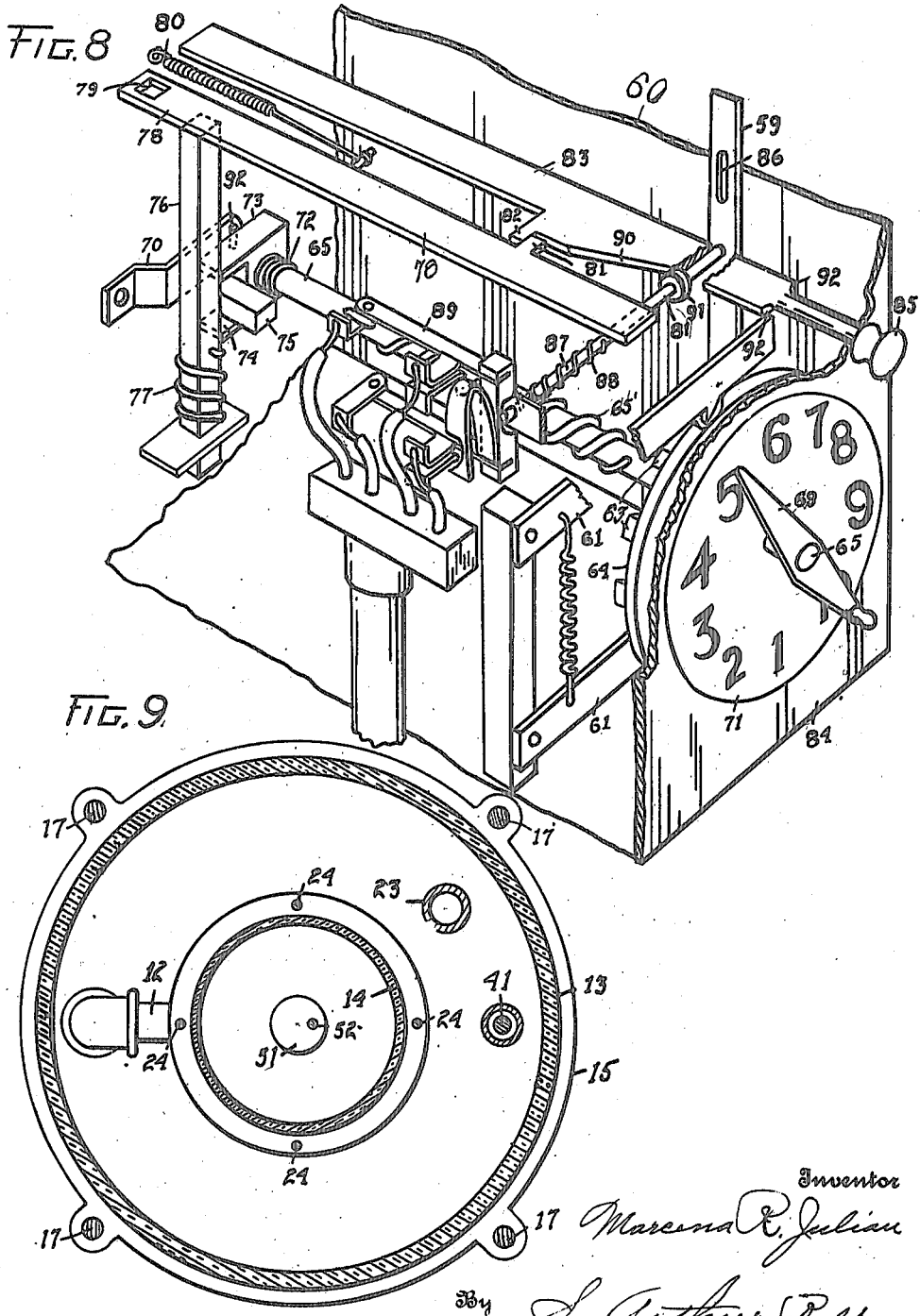

1,511,615

UNITED STATES PATENT OFFICE.

MARCENA R. JULIAN, OF JAMESTOWN, NEW YORK, ASSIGNOR OF ONE-THIRD TO ALMET N. BROADHEAD, OF JAMESTOWN, NEW YORK, AND ONE-THIRD TO DAN W. McCARTHY, OF LAKEWOOD, NEW YORK.

LIQUID-MEASURING PUMP.

Application filed December 27, 1920, Serial No. 433,174. Renewed September 4, 1924.

*To all whom it may concern:*

Be it known that I, MARCENA R. JULIAN, a citizen of the United States, residing at the city of Jamestown, in the county of Chautauqua and State of New York, have invented certain new and useful Improvements in Liquid-Measuring Pumps, of which the following, taken in connection with the accompanying drawings, is a specification.

The invention relates to measuring pumps for liquid; and the object of the improvement is to provide pumping and visible measuring and registering mechanism whereby, first, the liquid is drawn into a visible measuring container within an outer reservoir or container preferably by vacuum suction, the liquid automatically closing the connection to the vacuum suction pipe by means of a float and valve and admitting the free air, thereby releasing the vacuum suction on said liquid and emptying the liquid into said larger reservoir or container, the release of the liquid resetting the mechanism to immediately admit the vacuum suction and refill said measuring container, delivery mechanism being provided from said outer reservoir to the tank or container for use; and second, to provide control mechanism whereby any number of said inner measuring containers, which, for example, may be a gallon, may be designated, the control mechanism stopping automatically at the desired number of measures or gallons, the repeated filling and emptying of said inner container or gallon measure being fully visible to the purchaser so that the number of gallons or containers may be counted by the purchaser while measuring the same, the speed of the inner container measuring mechanism being capable of adjustment so as to produce a steady flow of the liquid through the delivery pipe until said designated amount is delivered; and the invention consists in the novel features and combinations hereinafter set forth and claimed.

In the drawings, Figure 1 is an elevation of the liquid measuring pump, the upper portion of the pedestal and measuring mechanism being shown partially in section to reveal the construction and arrangement of the different parts and their connection one to another, the inner measuring container and mechanism being shown in the position while filling. Fig. 2 is a partly sectional view of the measuring container and mechanism just after emptying the liquid from said container and before the movable closure plate or bottom for said container moves up into the full closure position, said position being shown in dotted outline, the vacuum suction valve being shown open and the free air valve closed; and Fig. 3 is a partially sectional view of the entire upper measuring portion of the pump showing the inner measuring container within the outer container or reservoir and the measuring mechanism at the exact point when said inner measuring container is filled with the liquid, the free air valve beginning to open, thereby releasing the weight of the liquid on to the closure plate or movable bottom, thereby moving the same downward and opening said measuring container, permitting the liquid to freely flow from the same into said outer reservoir. Fig. 4 is a sectional view of the spring valve for the free air as connected in the vacuum suction pipe. Fig. 5 is a sectional view of the control or cut out mechanism for the delivery of the desired amount of the liquid, showing the construction and arrangement of the same; and Fig. 6 is a sectional view at line 6—6 in rig. 5 parts being omitted, showing the escapement wheel of the control mechanism; and Fig. 7 is a side elevation of said escapement wheel with the connecting mechanism. Fig. 8 is a perspective view of the control mechanism showing the preferred construction and arrangement of the same. Fig. 9 is a crosswise sectional view at line 9—9 in Fig. 3 showing the preferred contour and arrangement of the outer and inner containers as to one another.

Like characters of reference refer to corresponding parts in the several views.

The numeral 10 designates the pedestal which is preferably a casing having therein a portion of the control mechanism for the operation of said pump, having the door 11 admitting to said control mechanism and showing the feed pipe 12 for the liquid at one side.

The pedestal 10 has the transparent, preferably glass, reservoir 13 on said pedestal which is usually cylindrical and has the measuring container 14 supported therein in a manner hereinafter described. Said container 14 is preferably an exact gallon measure when filled to the tripping point for emptying said container. The outer reservoir 13 is preferably supported on the top plate 15 of the pedestal 10 and has the cap plate 16 thereon which is attached to the pedestal top plate 15 by means of a plurality of suitable screw bolts or rods 17, the top 16 being preferably adapted to hold a glass globe 18 with connecting tube 19 thereto at one side for the electric wire connection 20 for a light in the globe 18. The tube 21 on the opposite side gives symmetry to the appearance of the pump head and at the same time provides free air within the cap plate 16 so that there is always sufficient free air within the reservoir 13 to give free flow to the liquid from the delivery container 13.

The measuring container 14 comprises the metallic bottom ring 22 which is supported upon the inlet pipe or tube 12 at one side, and by the rod or bolt connection 24 to the cap plate 25, which cap plate is connected to the vacuum suction pipe 23 preferably by threaded connection as shown in Fig. 2, the vacuum suction pipe 23 extending down the opposite side from the feed pipe 12 aids in supporting the measuring container.

The cap plate 25 for the container 14 has the dome 26 with the float chamber 27 therein to receive the float 28 upon the central valve stem 29, which valve stem bears the valve 30 on its upper end. The valve 30 seats on the valve seat 31 in the vacuum suction pipe 23. The float 28 has the valve 32 which seats on the valve seat 33 in the partition 34 in said dome 26, thereby providing the free air chamber 35 in the top of said dome 26. In order to hold the stem 29 in alinement and the float 28 thereon, a metal strap 36 is attached on the under side of said cap 25 which extends across from one side to the other beneath the dome 26, and has a hole 37 therethrough for the stem 29.

The stem 29 has the pin 38 at the upper end against which the valve 32 presses as the float 28 is carried upward by the liquid within the container 14 as it fills, it thereby raises the valves 30 and 32 against their seats 31 and 33 and closes the vacuum suction pipe 23 and air chamber 35. When said valve 30 closes, the extra draw on the vacuum suction pipe 23 creates a greater vacuum within said vacuum suction pipe 23, thereby creating a greater suction on the valve 39 which draws downward upon said valve 39 as it is held by the comparatively powerful spring 40, as shown in Fig. 4, and drawing downward on the link rod connection 41 and 42 and opening the free air valve 43, admitting the atmospherical pressure to the air chamber 35 in the dome 26, relieving the vacuum suction which supports the liquid within the measuring container 14 and permitting the full weight of said liquid to rest upon the movable bottom 44 to said container 14. The weight of the liquid presses said movable bottom 44 downward and permits the liquid to flow freely into the funnel-shaped secondary bottom 45 and out through the opening 46 in said funnel-shaped bottom 45 into the outer container 13, which outer container 13 has the delivery pipe 47 preferably through the bottom plate 15 and extending out through the pedestal 10 at one side, having the flexible delivery tubing 48 attached thereto with the hooked nozzle 49 on said tubing as shown in Fig. 1 for delivery to the automobile tank or other container.

The opening 46 in the secondary bottom 45 preferably extends around the vertical tube 50 which supports the bottom 44 for the container 14 thereon. The bottom 44 is preferably round and fits on the under edge of the ring 22 of the container 14, and has its upper surface beveled at an incline from the central portion thereof toward the outer edge so that the liquid will quickly and freely flow from the same in order that the process of emptying the reservoir 14 may be as rapid as possible, yet hold the weight of said liquid upon the bottom 44 in its secondary bottom 45 thereby ensuring pressing said bottom 44 downward at once to ensure actuating the counting and cut-out mechanism 60.

The bottoms 44 and 45 are slidably mounted on the tube 50 within the capped upper end 51 on bottom 44, which cap 51 supports thereon an upwardly extending rod 52 which is turned at right angles at its upper end in a loop around the valve stem 29. Said valve stem 29 is provided with a ball or enlarged lower end 53 so that when the bottoms 44 and 45 move downward, the rod 52 draws downward on the valve stem 29 thereby drawing the valve 30 in the vacuum suction tube downward. The free air chamber 35 is opened immediately upon admission of the air through the valve 43 to said chamber 35, thereby relieving the suction on the valve 32 and permitting said valve 32 to pass downward with the float 28 as the liquid recedes from the upper end of the measuring container 14, the valve 32 and float 28 being freely slidable upon the valve stem 29 and having the pin 38 in said valve stem accurately spaced from the valve 30 so that said valve 32 will seat itself simultaneously with said valve 30 as the float 28 is pressed upward by the liquid in the measuring container 14.

The cap 51 and bottoms 44 and 45 are supported upon a rod 55 which extends down through the tube 50 into the pedestal 10 and has link connection 56 to a weight 57, which link connection 56 balances across a pin 58 so that said weight 57 normally presses upward on said rod 55 so that when said bottom plate 44 is relieved from the weight of the liquid in the container 14, said weight 57 raises said bottom 44 firmly into the closure position against the lower edge of the ring 22 thereby closing the container 14 preparatory to refilling the same.

The vertical rod support 55 for the bottom plate 44 is also connected to a rod 59 which extends down to actuate the control and cut-out mechanism 60. Said control and cut-out mechanism 60 consists of the spring escapement levers 61 which are connected to the rod 59 by means of the arms 62, the arms 62 engaging the spring escapement levers 61 on opposite sides of the escapement wheel 64 by means of the escapement pins or teeth 63, a tooth or projection being provided on the side of the spring arm 61 adjacent the wheel 64 to engage said teeth or pins 63, the vertical upward and downward movement of the actuating rod 59 being shown in Fig. 6 in dotted line. The arms 62 are shown in the upper position, while the lower spring lever 61 is in holding contact on the escapement wheel 64 and the upper spring lever 61 is raised out of contact with said escapement wheel 64. The next downward movement of the actuating rod 59 presses the lower spring lever 61 out of contact with the spring pressed escapement wheel 64 allowing it to step back one step in its rotary movement, thereby counting the one measuring container of liquid emptied into the delivery container 13.

The escapement wheel 64 is loosely mounted on a shaft 65 upon which a second disk or wheel 66 is keyed or securely attached as shown in Fig. 7, alongside said escapement wheel 64. The disk or wheel 66 has preferably the two setting pins 67 on its opposite side in alinement with the series of holes 68 in the loosely mounted escapement wheel 64 so that when the disk 66 is turned to any desired adjustment of the same as to the number of gallons or measuring containers 14 to be drawn, the setting pins 67 correspondingly enter the holes 68 and the required number of measuring containers of liquid will be counted off by the backward stepping of the escapement wheel 64. A coil spring 65' is attached to the shaft 65 at one end and to a fixed support at the other end so as to give a torsional tension on the shaft 65 and wheel 66 with escapement wheel 64 attached thereto so that as the actuating rod 59 is moved upward and downward by the bottom 44 in emptying the liquid from the measuring container 14, said simple spring escapement levers 61 will permit the escapement wheel 64 to turn back step by step until the zero position is reached by the pointer 69.

The disk 66 is set in its relation to the escapement wheel 64 preferably by means of a pointer 69 on the spring controlled shaft 65. Said shaft 65 and disk 66 are normally pressed against the escapement wheel 64 by means of the spring 70 against the end of said shaft 65. The pointer 69 preferably has a handle by means of which said pointer and the shaft 65 are turned on the dial 71 to the desired number of gallons or measuring containers 14. The shaft 65 has the worm 72 thereon which turns in the similarly threaded tripping block 73. The tripping block has a mortised opening 74 which encloses the projecting lug 75 on the vertical bar 76. The bar 76 is pressed upward by means of the spring 77 thereby pressing the upper end of the bar 76 against the under side of the horizontal plate 78. The plate 78 has the opening 79 therein near its rear end in which the upper end of the bar 76 enters, being in alinement with said bar so that when the control plate 78 is drawn forward, the upper end of the bar 76 will be pressed into the opening 79 by means of the spring 77.

The control plate 78 is normally drawn toward the rear by means of a coil spring 80. This normal tension toward the rear presses a lug 81 on the plate 78 against a lug 82 on a bar 83 alongside the plate 78. The bar 83 extends out through the front of the casing 84 for the control mechanism and has a button 85 on its front end for moving the same backward and forward in starting and stopping the mechanism of the pump. The rod 59 has a slot 86 into which the end of the rod 87 is pressed by means of the spring 88, which rod 87 is connected to an electric switch 89 to the electric motor. The parallel control bar 83 has the incline 90 thereon so that when said bar 83 is drawn forward by means of the button 85, the shoulder 91 on the rod 87 is pressed sidewise along the incline 90, thereby closing said switch 89 and starting the motor and vacuum pump (not shown), which vacuum pump is connected to the vacuum pipe 23 and the measuring container 14 as hereinbefore described.

In operating the measuring pump, when a certain number of gallons or measuring containers 14 of gasoline or other liquid is desired to be pumped as for example, five, the pointer 69 is set upon the dial 71 at the numeral five as shown in Fig. 8, thereby turning the escapement wheel 64 by means of shaft 65 five teeth or pins 63 on said escapement wheel 64, the spring levers 61 holding said escapement wheel against the torsional strain of the coil spring 65', and turning the worm 72 and tripping block 73 to the required point to measure the five gallons or measuring containers 14. The control bar 83 is then drawn forward by means of the button 85 until it strikes its shoulder 92 on the casing 84, thereby moving the shaft 87 endwise sufficiently to close the electric switch 89 and start the motor and vacuum pump, which vacuum pump immediately begins withdrawing the air from the measuring container 14 to create a partial vacuum therein which draws the liquid into said measuring container 14.

The measuring container 14 is filled with the liquid until it presses upward on the float 28, thereby simultaneously closing the two valves 30 and 32 upon their respective seats 31 and 33. The increased suction in the tube or pipe 23 opens the free air valve 43, admitting the air to the chamber 35, releasing the valve 32 and permitting the float 28 to pass downward with the receding liquid as it flows out of the bottoms 44 and 45 of the measuring container 14. The air chamber 35 and second valve 32 on the valve stem 29 are necessary to prevent access of the liquid to the valve 43, otherwise said liquid under the vacuum suction might be forced out through said valve 43.

As the bottom 44 is moved downward in emptying the liquid into the secondary bottom 45 and thence out of said secondary bottom into the delivery container 13, the upwardly extending rod 52 draws downward on the valve stem 29, thereby opening the valve 30 in the vacuum suction pipe 23. As said bottom 44 is moved downward, also, it carries the rod 55 with its extension 59 until the spring rod 87 enters the slot 86 in said extension or actuating rod 59, thereby holding the rod 59 and bottom 44 in the lowered or open position for the measuring container 14, thereby cutting out the motor and vacuum pump by opening the electric switch 89. The bar 59 with its slot 86 will admit the end of the spring rod 87 at or near the zero point, thereby releasing said motor and vacuum pump as stated.

The tripping block 73 as it reaches the zero point is turned by the worm 72 against the pin 92, thereby causing said tripping block 73 to turn with the worm 72 and rod 65 and press downward on the projecting lug 75 on the bar 76, withdrawing said bar 76 from the opening 79 in the control bar 78 and permitting said control bar 78 to be drawn backward by the spring 80, also drawing backward by means of the lugs 81 and 82 on the parallel control bar 83, returning the parts to the normal inoperative position.

In order to fill the measuring container 14 evenly without bubbles or other deterents to the vision, the filling pipe 12 is preferably made large so as to give an even and full supply of light liquids like gasoline, so that said liquid will rise quickly and evenly in said measuring container 14 in filling the same. The large filling pipe 12 also gives a strong support to the ring 22 which forms the rigid lower portion of said measuring container 14.

The bottom 44 being now relieved of the weight of the liquid, weight 57 returns same to closed position, as above described.

What is claimed is:

1. In a gasoline dispensing device for use in gasoline stations and the like, a supporting frame structure, a normally empty delivery container having an outlet carried by the frame structure, a measuring container also carried by the frame structure and communicating with the delivery container to empty its contents therein, means formed for connection to a source of gasoline supply for supplying gasoline to said measuring container, means controlled at will of the operator to govern the filling and emptying of the measuring container into the delivery container, and means controlled by the operator to permit egress of the fluid from the outlet at the will of the operator, each of the containers being transparent so that the purchaser may view both the filling and subsequent emptying of the measuring container into the delivery container and the emptying of the delivery container.

2. In a measuring pump, a transparent delivery container, a transparent measuring container within the interior of the delivery container to empty its contents therein, means to automatically fill and then empty the measuring container, means to selectively effect any predetermined number of times of filling and then emptying of the measuring container, and means to conduct the fluid from the delivery container to the point of distribution.

3. In a measuring pump, a delivery container, a measuring container connected to said delivery container to empty into the same, means for filling said measuring container, mechanism automatically actuatable by the liquid to empty said measuring container into said delivery container, and control mechanism actuatable by the measuring mechanism to cut out said filling means after measuring a pre-determined number of containers of liquid.

4. In a measuring pump, a transparent measuring container within a transparent and normally empty delivery container, means for filling said measuring container, and means for emptying said measuring container into said delivery container.

5. In a measuring pump, a delivery container, a measuring container in said delivery container, means for filling said measuring container, and pneumatic means automatically actuated to empty said measuring container into said delivery container when filled to a pre-determined point.

6. In a measuring pump, a delivery container, a measuring container egressing into the delivery container, vacuum means for filling the measuring container, means for destroying the vacuum to thereby empty the measuring container into the delivery container, and means for reestablishing the vacuum to effect refilling of the measuring container.

7. In a gasoline device for use in gasoline stations and the like, a supporting frame structure, a normally empty delivery container having an outlet carried by the frame structure, a measuring container located within the delivery container to empty its contents therein, means formed for connection to a source of gasoline supply for supplying gasoline to said measuring container, means controlled at will of the operator to govern the filling and emptying of the measuring container into the delivery container, and means controlled by the operator to permit egress of the fluid from the outlet at the will of the operator, each of the containers being transparent so that the purchaser may view both the filling and subsequent emptying of the measuring container into the delivery container and the emptying of the delivery container.

8. In a measuring pump, a transparent delivery container, a transparent measuring container mounted in said delivery container, vacuum pumping means for filling said measuring container, means to automatically effect emptying of the measuring container into the delivery container when the measuring container is filled to a predetermined level, and manually controlled means for effecting a predetermined number of times of filling and emptying of the measuring container into the delivery container.

9. In a measuring pump, a delivery container having glass sides, a measuring container supported in said delivery container, said measuring container having glass sides, vacuum suction for filling said measuring container, means in the top of said measuring container to cut off said vacuum suction and admit the air to said measuring container, and mechanism released by said vacuum cut-off to empty said container by gravity.

10. In a measuring pump, a transparent measuring container within a transparent delivery container, means for filling said measuring container, and a movable bottom on said measuring container to empty the same.

11. In a measuring pump, a measuring container within a delivery container, means for filling said measuring container, a vertically movable bottom on said measuring container and means for closing the same, and means to automatically release said bottom when said measuring container is filled with liquid to empty the same by gravity.

12. In a measuring pump, a measuring container within a delivery container, means for filling said measuring container with liquid, a vertically movable bottom for said measuring container and means for closing the same, means releasing said bottom to drop the same by gravity, and a cut-off liquid actuated valve in the top of said measuring container attached to said movable bottom to be drawn down thereby to open said valve when emptying said container.

13. In a measuring pump, a delivery container having transparent sides, a transparent measuring container mounted concentrically within said delivery container, a movable bottom for said measuring container and means for closing the same, vacuum pumping means connected to said measuring container to fill the same, said vacuum pumping means when cut off automatically opening an air valve to drop said movable bottom by gravity from the weight of the liquid thereon.

14. In a measuring pump, a delivery container having transparent sides, a measuring container mounted in said delivery container and having transparent sides, a filling tube connected to said measuring container, a vacuum suction tube connected to said measuring container to draw the liquid through said filling tube, a float in the upper portion of said measuring container connected to a valve in said vacuum suction tube to cut off the same when said measuring container is drawn full of liquid, an air valve opened by the increased suction on said vacuum suction tube when closed to admit air to said container, and a movable bottom on said measuring container borne down by gravity when released from said vacuum suction to empty said measuring container into said delivery container.

15. In a measuring pump, a delivery container having transparent sides, a measuring container mounted within said delivery container and having transparent sides to show the filling of the same, a vacuum suction tube connected to the top of said measuring container to produce a partial vacuum therein, a filling tube connected to said measuring container to fill said container by the draw of the vacuum suction, a movable bottom on said measuring container, a float in the top of said measuring container, a valve connected to said float and extending to said vacuum suction pipe to cut off the same, a second valve connected to said vacuum suction tube adapted to be actuated by the increased suction on said tube when cut off and connected to an air valve in said measuring container to open the same and drop said movable bottom by the weight of the liquid within said measuring container.

16. In a measuring pump, a delivery container, a measuring container egressing into the delivery container, vacuum means for filling the measuring container, means for destroying the vacuum to thereby empty the measuring container into the delivery container, means for reestablishing the vacuum to effect refilling of the measuring container, and means for controlling all of the aforesaid means to enable any predetermined number of times of filling and emptying of the measuring container to be effected.

17. In a measuring pump, a delivery container, a measuring container supported in the upper portion of said delivery container, automatic emptying mechanism for said measuring container into said delivery container for filling the latter to a pre-determined point, and control mechanism actuated by said emptying mechanism to stop the filling of said measuring container at a pre-determined number of containers of liquid.

18. In a measuring pump, a delivery container, a measuring container supported in the upper portion of said delivery container, pneumatic means for filling and emptying the measuring container, a movable bottom for said measuring container to empty the same, control mechanism actuated by said movable bottom comprising step by step escapement mechanism, and cut-out mechanism for the pneumatic means at a pre-determined number of steps in said escapement mechanism.

19. A measuring pump comprising a measuring container supported in the upper portion of a delivery container, vacuum suction mechanism for filling and emptying said measuring container, control mechanism actuated by the emptying of said measuring container consisting of a step by step escapement mechanism, and a cut-out mechanism for said suction mechanism adapted to set at a predetermined number of steps, each filling and emptying of said measuring container actuating said escapement mechanism one step.

20. In a measuring device, a delivery container, a measuring container therein, and pneumatic means for filling and then emptying the measuring container into the delivery container.

21. In a measuring device, a delivery container, a measuring container, each of said containers being formed so that the purchaser may view the filling and emptying of the same, means for filling and emptying the measuring container into the delivery container, and manually controlled means for continuously and automatically effecting a predetermined number of times of filling and emptying of the measuring container into the delivery container.

22. In a measuring device, a delivery container, a measuring container, and manually controlled means for continuously and automatically effecting a predetermined number of times of filling and emptying of the measuring container into the delivery container.

23. In a measuring device, a supporting frame structure, a normally empty transparent delivery container having an outlet carried by the frame structure, a transparent measuring container located within and communicating with the delivery container to empty its contents therein, means controlled at will of the operator to govern the filling and emptying of the measuring container into the delivery container, and means controlled by the operator to permit egress of the fluid from the outlet at the will of the operator.

24. In a measuring device, a delivery container, a measuring container egressing into the delivery container, vacuum means for filling the measuring container, and means for emptying the measuring container and for then reestablishing the vacuum to effect refilling of the measuring container.

25. In a measuring pump, a delivery container, a measuring container communicating therewith, pneumatic means for filling the measuring container, and pneumatic means for effecting emptying of the measuring container into the delivery container.

In testimony whereof I have affixed my signature in the presence of two witnesses.

MARCENA R. JULIAN.

Witnesses:
C. V. SWANSON,
L. T. BALDWIN.